United States Patent Office 3,105,234
Patented Sept. 24, 1963

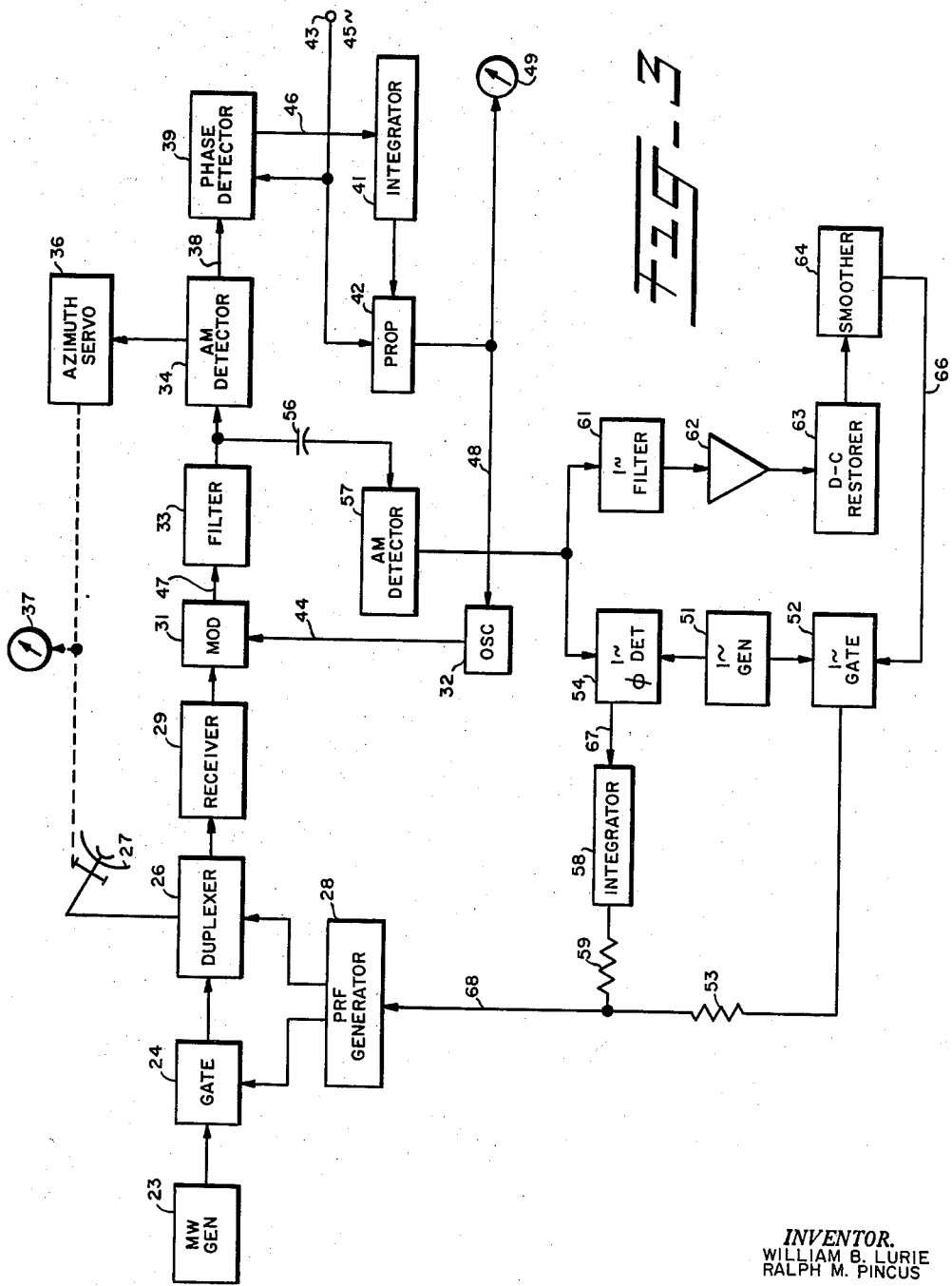

3,105,234
DOPPLER NAVIGATOR ALTITUDE ERROR CORRECTOR
William B. Lurie, New Rochelle, and Ralph M. Pincus, New York, N.Y., assignors to General Precision, Inc., a corporation of Delaware
Filed Oct. 14, 1960, Ser. No. 62,631
5 Claims. (Cl. 343—8)

This invention relates to pulsed Doppler radar instruments, and particularly to apparatus for applying automatic corrections of altitude errors in such an airborne instrument.

Doppler navigation instruments for aircraft employ several narrow beams of microwave radiation. These beams are directed obliquely toward the earth and, by measurement of the Doppler frequency changes of their echoes, the aircraft's ground track direction and speed can be found.

The aircraft's speed may change, changing the received Doppler frequency information. That portion of the receiver which measures the Doppler frequency must, therefore, be adapted to lock to the incoming frequency and to track it as it changes. This component of the receiver is termed the frequency tracker, and can be constructed to measure the center frequency of the received Doppler spectrum with high accuracy. Such a frequency tracker is described in U.S. Patent No. 2,915,748.

Pulsed Doppler radar instruments transmit in pulses and include gating means to disable the receiver during each transmitted pulse. If the aircraft be at such an altitude that the received echo signal arrives while the receiver is cut off, the received echo signal cannot be used. If only part of the echo signal be received a distortion of information results which causes an error in the speed and direction outputs of the instrument. This error can be large, and is maximum near the altitude at which the echo is delayed with respect to the originating pulse by a time equal to the pulse repetition period or a multiple of that period. Such an altitude is often termed the altitude of a "hole," or an "altitude hole."

This altitude error or hole effect is more fully described in Transactions of the Professional Group on Aeronautical and Navigational Electronics of the Institute of Radio Engineers, volume ANE-4, December 1957, page 157.

The present invention eliminates the altitude hole effect by continuously adjusting the frequency of pulse repetition to the aircraft's altitude so that the aircraft is never at an altitude hole. In doing this, the invention periodically changes the pulse repetition frequency at a low rate over a small range. The resulting amplitude pulsation of the frequency tracker signal is converted to a correction signal which is applied to move the average pulse repetition frequency to such value as to eliminate the amplitude pulsation. This new value of the pulse repetition frequency is then the best for the altitude at which the aircraft is located.

One purpose of this invention is to provide a Doppler radar navigator which is not subject to altitude hole effects.

Another purpose of this invention is to provide a circuit arrangement incorporated in the transmitter-receiver for automatically changing the transmitter pulse repetition frequency to a value at which the receiver will not experience altitude error.

Still another purpose of this invention is to provide means for sensing signal intensity variations due to altitude holes and in response thereto to change the pulse repetition frequency so that the received signal intensity is increased to the maximum possible amount and variations due to altitude holes are eliminated.

Further understanding of this invention may be secured from the detailed description and associated drawing in which:

FIGURE 3 depicts a schematic block diagram of an embodiment of the invention.

Figure 1:
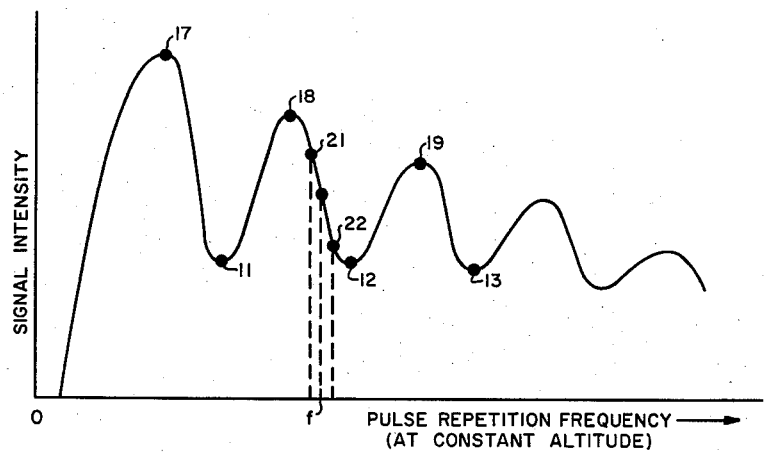
FIGURE 1 is a graph of variation of received signal intensity with change of pulse repetition frequency at constant altitude.

When a pulsed Doppler radar on an aircraft transmits a beam obliquely to the earth and receives the echo signal, the time, T, elapsed between transmission of the pulse and reception of the echo governs the altitude hole effect. Little or no signal is received when the reciprocal of the time, T, is equal to an integral fraction of the pulse repetition frequency. That is, for minimum signal, $$\frac{1}{T} = \frac{PRF}{n} \quad (1)$$

in which PRF is the pulse repetition frequency and $n$ is an integer. Inserting the relation between the altitude $h$, time T, and angle of incidence $\psi$, $$PRF = \frac{nc \cos \psi}{2h} \quad (2)$$

in which $c$ represents the speed of light. A number of minima are obtained when 0, 1, 2, etc., are inserted for $n$. The signal intensity variation with PRF is shown in FIGURE 1 for a selected constant altitude. The minimum signal occurs at points 11, 12 and 13 and maximum errors in system outputs occur near these points.

Figure 2:
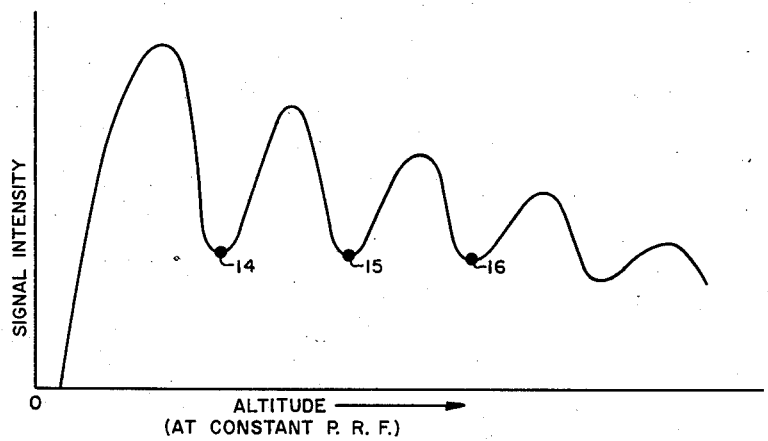
FIGURE 2 is a graph of variation of received signal intensity with change of altitude at constant pulse repetition frequency.

When Equation 2 is rearranged to give the altitudes at which minimum intensities occur, at constant PRF, the signal intensity variation is as shown in FIGURE 2. As the aircraft ascends or descends, it passes through successive minima, or altitude holes, in the vicinity of which the instrument output will be in serious error. These hole locations are indicated in FIGURE 2 at 14, 15 and 16. At the recurring maxima of both curves, as at points 17, 18, and 19 of FIGURE 1, no output errors due to this cause exist, and near these points on the curve the errors are negligible.

In this invention operation is maintained at one of these maximum intensity points. The general method is to sample two points on the curve of operation, FIGURE 1, such as points 21 and 22, measure the slope and secure an error signal representing it, and then, by changing the pulse repetition frequency, to cause the two points 21 and 22 to migrate toward the nearest curve maximum, such as point 18, until the average slope between the two sampling points becomes zero. The error signal is thereby brought to a null or made to disappear.

A circuit for doing this is shown in FIGURE 3. A microwave generator 23 transmits microwave energy through a gate circuit 24 and a duplexer 26 to an antenna 27. A pulse repetition frequency generator 28 is connected to the gate circuit 24 to pulse the transmitted microwave energy.

A microwave receiver 29 receives the echo signal from the duplexer circuit 26 and derives therefrom a signal including the Doppler difference frequency spectrum. The receiver is also connected to the PRF generator 28 so that the receiver is gated off during the period of each transmitter pulse. The receiver output signal is applied to the first component of the frequency tracker, namely, a modulator 31. A heterodyning signal from an oscillator 32 is also applied to the modulator 31. The difference frequency signal output of the modulator is applied to a fixed filter 33. This filter may be low-pass or may be a band-pass filter but as an example it here has a transmission band centered at 36 kc.p.s. and 1 kc.p.s.

wide. The filter output is demodulated in a detector 34 to provide error signal outputs. One output containing azimuth angle information is applied through a servomechanism 36 to position the antenna 27 to point along the aircraft ground track. An indicator 37 operated by the servomechanism motor shaft indicates aircraft drift angle.

A second output of the detector 34 at conductor 38 is applied to a phase detector 39 emitting an error output. This output is integrated in an integrator 41 and the integrated signal is applied, through a proportioning circuit 42, to control the frequency of the oscillator 32 so as to bring the error signal toward zero.

The proportioning circuit 42 is also supplied with a 45-c.p.s. square wave input from terminal 43. This output is additionally applied as the phase reference to the phase detector 39.

In the operation of this frequency tracker, its closed loop contains, at conductor 44, the output of oscillator 32 frequency modulated at 45 c.p.s. This modulation, at the filter 33, provides error sense, and is detected by the amplitude modulation detector 34 having such time constant as to derive the 45-c.p.s. modulation as its output signal. The amount and phase of this 45-c.p.s. component at the input 38 of the phase detector 39 represents the frequency discrepancy between the signal applied to the filter 33 and the filter transmission characteristic. Thus, the phase detector output at conductor 46 contains a direct current component representing by amplitude and sign the amount and direction of the discrepancy. The loop feedback operation brings the signal frequency at conductor 47 into equality with the filter transmission characteristic frequency, the average amplitude of the signal in conductor 48 then representing the average Doppler spectrum frequency and therefore the aircraft ground track speed. This signal is indicated at indicator 49, which can be calibrated in speed units.

The system so far described is conventional, and is described in greater detail in the patent and publication references, supra. It is referred to only generally herein as indicative of the apparatus with which the circuit of the invention is associated.

A square wave generator, 51, generates a signal frequency which is lower than any other frequencies which may exist in the system. This is to permit the output frequency of generator 51 to be easily segregated by filtering or otherwise. As an example, the frequency of generator 51 may be one-c.p.s., far lower than the frequency of 45 c.p.s. at terminal 43. The output of generator 51 is applied to control a gate circuit 52. The output of generator 51 is also applied as phase reference to a one-c.p.s. detector 54.

The output of the filter 33 is coupled through a capacitor 56 to another amplitude modulation detector 57 having a time constant suitable for deriving a one-c.p.s. demodulated output. This output is applied to the one-c.p.s. phase detector 54. The phase detector 54 direct-current phase error output is applied to another integrator 58. The integrator 58 direct-current output is applied through a resistor 59 to the pulse repetition generator 28.

The output of detector 57 is also applied to a 1-c.p.s. filter 61. The 1-c.p.s. output is amplified in amplifier 62, resulting in an alternating potential at 1-c.p.s. having no direct-current bias. A bias equal to one half the peak-to-peak alternating potential is applied by the D.-C. restorer circuit 63. This circuit comprises a simple limiting diode, so that the negative maxima of the alternating potential are placed at ground or zero potential. The output is applied to a simple low-pass filter or smoother circuit 64, which removes the 1-c.p.s. alternations and emits direct current in conductor 66 having a potential directly proportional to the alternating potential output of the detector 57. The output of smoother 64 is applied to the 1-c.p.s. gate 52, the output of which is coupled through a resistor 53 to the pulse repetition generator 28.

In the operation of this circuit, the control conductor 68 is connected to the pulse repetition generator 28 so that the frequency of the latter is a direct function of the potential applied by the conductor. This potential has direct and alternating components, which are added by means of resistors 53 and 59 to form a single, composite control potential.

The direct component is secured from the output of integrator 58, and is proportional to the integral of the rectified error signal output of detector 57. The alternating component is secured from the direct-current output of the smoother 64 by gating it at 1-c.p.s. by means of the gate circuit 52, retaining the potential amplitude of the smoother output which becomes the peak-to-peak alternating amplitude. Since the smoother amplitude is proportional to the amplitude of the detector 57 output, the 1-c.p.s. amplitude in conductor 68 is also proportional to it. The alternating and direct amplitudes applied to the PRF generator 28 are so proportioned that the former is a few percent of the latter.

In the operation of the circuit of FIGURE 3, the average value of frequency of the generator 28 is controlled by the integrator 58, while the frequency is oscillated or modulated above and below this average value by the 1-c.p.s. square wave generator 51. Let it be assumed that the average value of the pulse repetition frequency is $f$, FIGURE 1, and that the 1-c.p.s. generator 51 changes this average frequency between the values represented by points 21 and 22, so that during one-half second the frequency attains the point 21 and for the next half second the frequency attains the point 22, equidistant from frequency $f$.

It is not necessary that the generator 51 output be rectangular. It may be sinusoidal, triangular, or have any other periodic waveform, but for the purpose of this example a rectangular form is preferred.

In accordance with FIGURE 1, variation of the pulse repetition frequency above and below the frequency $f$ causes corresponding variation of the received signal intensity. That is, the 1-c.p.s. modulation of the pulse repetition frequency is converted to a received signal intensity modulation at 1-c.p.s., and this intensity modulation exists at the input to modulator 31. It also persists at the filter 33 input and output. At the filter output the signal, after demodulation in detector 57, is applied to the phase detector 54 for synchronous detection at 1-c.p.s. The output consists of direct-current having an amplitude representative of the 1-c.p.s. component amplitude and having a polarity representative of the sign of the slope of the graph of FIGURE 1. For example, negative potential in conductor 67, FIGURE 3, may be made to indicate that the slope of the graph of FIGURE 1 at frequency $f$ is negative.

The potential in conductor 67 controls the output potential of integrator 58 which in turn controls the average frequency of the PRF generator 28. In the example, negative potential in conductor 67 causes the output potential of integrator 58 to decrease, causing the pulse repetition frequency to decrease from $f$ to a lesser value approximating that at point 18, FIGURE 1. As the pulse repetition frequency approaches that of the point 18 along the curve, the difference in received signal intensity between the modulation extremes decreases. Therefore, the magnitude of the 1-c.p.s. component in the Doppler signal applied to modulator 31 decreases. When the points 21 and 22 representing 1-c.p.s. excursion have been moved to exactly bracket the point 18, the 1-c.p.s. modulation of the received signal disappears. At this time the output of the phase detector 54 becomes zero. The output of integrator 58 becomes constant, and the pulse repetition mean frequency becomes that value corresponding to point 18, approximately half-way between the two altitude hole values 11 and 12, or at least far removed from these values.

If operation should be initiated on a positive slope of the curve, as between the points 11 and 18, the polarity of the error signal in conductor 67 will be reversed, i.e., will be positive, the output potential of integrator 58 will be made to increase and the pulse repetition frequency to increase, again approaching the point 18. Initiation of operation may occur at a minimum point as at 11 or 12, which also has zero slope and will result in zero magnitude of the 1-c.p.s. component. Such a false balance point is unstable, however, and fortuitous variations of altitude or pulse repetition frequency will quickly displace operation from this false balance point enough to apply some 1-c.p.s. component to the modulator 31, initiating the above-described action of the altitude hole correction loop.

What is claimed is:

1. A device for eliminating altitude hole effect errors in airborne pulsed Doppler radar systems comprising, a pulsed microwave transmitter including a pulse repetition frequency generator, a gated echo receiver associated therewith, a frequency tracker containing a resonant filter, means applying the signal output of said gated echo receiver to said frequency tracker, a low-frequency generator frequency modulating said pulse repetition frequency generator, means demodulating the output of said resonant filter to form an error signal having said low frequency, means referenced to said low frequency generator for phase detecting said error signal to form a direct-current error signal, an integrator controlled thereby, and means applying the integral output of said integrator to adjust said pulse repetition frequency generator frequency in such direction as to reduce said error signals to zero.

2. A device for eliminating altitude hole effect errors in airborne pulsed Doppler radar systems comprising, a radio transmitter, a pulse repetition frequency generator pulsing said radio transmitter, a receiver gated off by said pulse repetition frequency generator during transmitter pulses, a frequency tracker containing a resonant filter, means applying the output of said receiver to said frequency tracker, a low-frequency generator, an amplitude modulation detector demodulating said filter output to produce an alternating error signal, a phase detector referenced to said low-frequency generator converting said alternating error signal to a direct current error signal, an integrator integrating said direct current error signal, addition means applying said integrated error signal to control the average frequency of said pulse repetition frequency generator, and proportioning circuit means applying to said addition means a low-frequency signal from said low-frequency generator having an amplitude proportional to the amplitude of said alternating error signal.

3. A device for eliminating altitude hole effect errors in airborne pulsed Doppler radar systems comprising, a pulsed microwave transmiter including a pulse repetition frequency generator, a gated echo receiver associated therewith, a frequency tracker containing a resonant filter, means applying the signal output of said echo receiver to said frequency tracker, a low-frequency generator, addition means applying the output of said low-frequency generator to said pulse repetition frequency generator to frequency modulate the signal generated thereby and producing a signal modulated by said low frequency at the output of said filter, a detector having said filter output impressed thereon and producing therefrom an alternating error signal at said low frequency, a phase detector referenced from said low-frequency generator having said alternating current error signal impressed thereon and producing therefrom a direct current error signal whose amplitude and polarity are representative of the amplitude and phase sense of the alternating error signal, an integrator integrating said direct current error signal, and means applying the integral output signal of said integrator to said pulse repetition frequency generator to change and control the average frequency of said pulse repetition frequency generator in such direction and by such amount as to reduce said error signal to zero.

4. A device for eliminating altitude hole effect errors in airborne pulsed Doppler radar systems comprising, a microwave generator, an antenna for radiating the energy generated thereby, a pulse repetition frequency generator connected to said microwave generator for pulsing the output thereof, a gated echo receiver connected to said antenna for receiving reflected echo pulse signals, said echo receiver being gated off by said pulse repetition frequency generator during periods of pulse transmission, a frequency tracker connected to said receiver for tracking the Doppler frequency spectrum signal output of said receiver, a low-frequency generator having a frequency less than and separably different from the other signal frequencies in said system, addition means applying the output of said low-frequency generator to said pulse repetition frequency generator to frequency modulate the signal generated thereby whereby the Doppler frequency spectrum signal output of said receiver is amplitude modulated at the frequency of said low-frequency generator, a detector connected to said frequency tracker producing an alternating error signal proportional to the amplitude modulation of said Doppler spectrum signal output, a phase detector referenced from said low-frequency generator having the output of said first mentioned detector applied thereto and producing therefrom a direct current error signal whose amplitude and polarity are representative of the amount and sense of the change of frequency of said pulse repetition frequency generator necessary to position adjacent altitude holes at equal distances above and below the aircraft carrying said airborne system, an integrator controlled by said direct current signal, the output of said integrator being applied to said addition means changing the average frequency of said pulse repetition generator in such direction and by such amount as to reduce said error signals to zero.

5. A device for eliminating altitude hole effect errors in airborne pulsed Doppler radar systems comprising, a radio transmitter, a pulse repetition frequency generator connected to and pulsing said radio transmitter, a receiver receiving echoes of the signals transmitted by said transmitter, said receiver being gated by said pulse repetition frequency generator, a frequency tracker containing a resonant filter having its input connected to the output of said receiver, an amplitude modulation detector demodulating said filter output to produce an alternating error signal, a low-frequency generator, a phase detector referenced to said low-freqeuncy generator converting said alternating error signal to a direct current error signal, an integrator integrating said direct current error signal, addition means applying said integrated error signal to said pulse repetition frequency generator to control the average frequency thereof, means connected to said amplitude modulation detector for filtering and amplifying said alternating error signal, restorer means for converting the output of said last-named means to a proportional direct current signal, means smoothing said proportional direct current signal, gate circuit means referenced to said low-frequency generator generating from said smoothed proportional direct current signal an alternating signal having the phase of said low-frequency generator and an amplitude directly proportional to the amplitude of said alternating error signal, and means applying said alternating signal to said addition means.

References Cited in the file of this patent

UNITED STATES PATENTS

| | | |
|---|---|---|
| 2,869,119 | Fredrick | Jan. 13, 1959 |
| 2,914,764 | Flower | Nov. 24, 1959 |